United States Patent
Mehra

(10) Patent No.: US 7,552,189 B2
(45) Date of Patent: Jun. 23, 2009

(54) SYSTEM AND METHOD FOR USING VIRTUAL DIRECTORIES TO SERVICE URL REQUESTS URL REQUESTS IN APPLICATION SERVERS

(75) Inventor: Vinod Mehra, Alameda, CA (US)

(73) Assignee: BEA Systems, Inc., San Jose, CA (US)

( * ) Notice: Subject to any disclaimer, the term of this patent is extended or adjusted under 35 U.S.C. 154(b) by 636 days.

(21) Appl. No.: 10/347,077

(22) Filed: Jan. 17, 2003

(65) Prior Publication Data

US 2003/0140115 A1 Jul. 24, 2003

Related U.S. Application Data

(60) Provisional application No. 60/349,466, filed on Jan. 18, 2002.

(51) Int. Cl.
*G06F 15/16* (2006.01)
(52) U.S. Cl. .............. 709/215; 709/213; 709/214; 709/224; 709/226; 707/100
(58) Field of Classification Search .............. 709/222, 709/213, 214, 215, 216, 220, 204, 230, 238, 709/250; 707/100, 102
See application file for complete search history.

(56) References Cited

U.S. PATENT DOCUMENTS

| | | | |
|---|---|---|---|
| 5,928,323 A * | 7/1999 | Gosling et al. ............... 709/203 |
| 5,991,306 A | 11/1999 | Burns et al. |
| 6,047,323 A | 4/2000 | Krause |
| 6,128,655 A | 10/2000 | Fields et al. |
| 6,167,522 A * | 12/2000 | Lee et al. ............... 726/2 |
| 6,256,031 B1 * | 7/2001 | Meijer et al. ............ 715/854 |
| 6,289,393 B1 | 9/2001 | Phillips et al. |
| 6,323,881 B1 * | 11/2001 | Broulik et al. ............ 715/744 |
| 6,345,386 B1 | 2/2002 | Delo et al. |
| 6,412,000 B1 * | 6/2002 | Riddle et al. ............ 709/224 |
| 6,418,554 B1 | 7/2002 | Delo et al. |
| 6,453,342 B1 | 9/2002 | Himmel et al. |
| 6,457,051 B1 * | 9/2002 | Riddle et al. ............ 709/224 |
| 6,480,860 B1 * | 11/2002 | Monday ............... 707/102 |
| 6,505,242 B2 * | 1/2003 | Holland et al. ............ 709/219 |

(Continued)

OTHER PUBLICATIONS

Servlet container:- Micosoft Compute Dictionary 5$^{th}$ edition, p. 475.*

(Continued)

*Primary Examiner*—William C Vaughn, Jr.
*Assistant Examiner*—Scott Christensen
(74) *Attorney, Agent, or Firm*—Fliesler Meyer LLP

(57) ABSTRACT

The invention provides a system and method for providing virtual directories for servlets, particularly for use by many different Web applications that share common files and resources, and that are intended for providing those resources to large numbers of users. Virtual directories provide a mechanism for automatically changing the root folder from the default Web application (webapp) root document folder (docroot) to a virtual directory or folder, in response to certain http/URL requests. The purpose of the feature is to allow the developer to configure different document roots for certain requests. By doing this they can direct certain kind of requests (particularly those for common resources) to a common document root. Virtual directories ensure that common resources do not have to be copied for all web applications separately, and the burden on the server itself is minimized.

16 Claims, 2 Drawing Sheets

U.S. PATENT DOCUMENTS

| | | |
|---|---|---|
| 6,546,554 B1 | 4/2003 | Schmidt et al. |
| 6,604,143 B1 | 8/2003 | Nagar et al. |
| 6,625,624 B1 | 9/2003 | Chen et al. ................... 707/204 |
| 6,704,781 B1 | 3/2004 | Einarson et al. ............. 709/223 |
| 6,757,708 B1 | 6/2004 | Craig et al. |
| 6,983,318 B2 | 1/2006 | Doyle .......................... 709/223 |
| 7,089,584 B1* | 8/2006 | Sharma .......................... 726/4 |
| 2002/0112032 A1 | 8/2002 | Martin et al. |
| 2002/0120710 A1 | 8/2002 | Chintalapati et al. |
| 2002/0133603 A1* | 9/2002 | Mitomo et al. .............. 709/229 |
| 2002/0147735 A1* | 10/2002 | Nir ............................ 707/200 |
| 2003/0061247 A1* | 3/2003 | Renaud ...................... 707/205 |
| 2003/0140115 A1 | 7/2003 | Mehra et al. |
| 2004/0064570 A1 | 4/2004 | Tock |
| 2004/0254921 A1 | 12/2004 | Cohen et al. |

OTHER PUBLICATIONS

Fielding, R., et al., RFC 2616, "Hypertext Transfer Protocol—HTTP/1.1," Jun. 1999, Table of Contents (pp. 1-6), Section 14, pp. 1-39.

Berners-Lee, T. et al., RFC 1945, Hypertext Transfer Protocol—HTTP/1.0, May 1996, pp. 1-57.

* cited by examiner

SYSTEM AND METHOD FOR USING VIRTUAL DIRECTORIES TO SERVICE URL REQUESTS URL REQUESTS IN APPLICATION SERVERS

CLAIM OF PRIORITY

This application claims priority from provisional application "SYSTEM AND METHOD FOR USING VIRTUAL DIRECTORIES TO SERVICE URL REQUESTS IN APPLICATION SERVERS" Application No. 60/349,466 filed Jan. 18, 2002, and which application is incorporated herein by reference.

FIELD OF THE INVENTION

The invention relates generally to application servers and particularly to a system and method for providing virtual directories for servlets.

CROSS-REFERENCES

This application is related to U.S. Provisional Patent Application No. 60/349,443, "SYSTEM AND METHOD FOR URL RESPONSE CACHING AND FILTERING IN SERVLETS AND APPLICATION SERVERS" filed Jan. 18, 2002 and U.S. Provisional Patent Application No. 60/349,456, "SYSTEM AND METHOD FOR PLUGGABLE URL PATTERN MATCHING FOR SERVLETS AND APPLICATION SERVERS" filed Jan. 18, 2002, both of which applications are incorporated herein by reference.

BACKGROUND

An ever-increasing number of e-commerce providers or e-businesses rely on application server technology as the lifeblood of their business. Application servers form a proven foundation for supporting e-commerce applications, providing the presentation, business and information-access logic, security and management services, and underlying infrastructure required for highly scalable and mission-critical software applications. Increasingly, the demands of today's modern businesses require support for a new breed of Web and wireless applications, helping to meet the needs of increasingly sophisticated customers.

One such application server, WebLogic Server, from BEA Systems, Inc. San Jose, Calif., is based on an implementation of the Java 2 Enterprise Edition (J2EE) specification. WebLogic Server is used as the backbone for many of today's most sophisticated e-business applications, playing an integral role in a tightly integrated, comprehensive infrastructure that delivers commerce, personalization, campaign management, enterprise integration, workflow management, and business-to-business collaboration. From Web and wireless clients to Windows, Unix, and mainframe servers, WebLogic Server manages all of the underlying complexities of a business' e-commerce applications, allowing the organization to focus instead on delivering new and innovative products and services.

A typical application server, including WebLogic Server, supports a variety of clients, including Web browsers, and wireless devices. On the server side, WebLogic Server supports leading Unix, Linux, Windows, and mainframe operating systems. On the back-end, WebLogic Server integrates with relational databases, messages queues, and legacy systems. WebLogic Server provides support for features such as Servlets, Java Server Pages (JSPs), Enterprise JavaBeans (EJBs), Java Messaging Service (JMS), to provide access to standard network protocols, database, and messaging systems. When developing applications, developers can create, assemble, and deploy components that use these services.

In a typical deployment, WebLogic Server also includes a Web server for hosting static content and dynamic J2EE Web applications. J2EE Web applications typically include a collection of HTML/XML pages, Java Server Pages, Servlets, Java classes, applets, images, multimedia files, and other file types. WebLogic Server may also be integrated with other Web servers such as Apache, Microsoft IIS, or Netscape Web servers. Web components usually provide the presentation logic for browser-based or wireless applications, while EJB components encapsulate business objects and processes.

One of the problems with current Web server and application server offerings is that many hundreds, and sometimes thousands, of users may need access to the same resource at the same moment in time, using different web applications. This resource may be a servlet page, JSP, static content html page, or associated images etc. A typical production system may involve multiple web-applications (webapps). In these instances, the J2EE specification doesn't allow sharing of common resources, for example pages, images and other files. As a result the customers (in this context the software developers) end up copying the shared resources multiple times for each webapp. This places great strain on the resources of the application server or Web server, particularly in terms of memory usage.

Another problem with traditional Web and application server offerings are that files such as images, which may be common to many Web applications, usually need to be copied to the resource space or folder for each application. Web applications typically lack a mechanism by which they can share a single copy of a resource. While centralizing common resource files for all applications is extremely important for Web sites to assist in the setup and maintenance of that Web site, it is an administrative burden to copy the resources for all web applications separately.

E-commerce providers (developers) would benefit greatly from a convenient mechanism that allows for centralized control of common resources and files, and that reduces the burden on the server of responding to many common http requests.

SUMMARY

The invention provides a system and method for providing virtual directories for servlets, particularly for use by many different Web applications (webapps) that share common files and resources, and that are intended for providing those resources to large numbers of users. Virtual directories provide a mechanism for automatically changing the docroot of the given Web application to a virtual directory or folder, in response to certain http requests. The purpose of this feature is to allow the developer to configure different document roots for certain requests so that the common resources can be shared between multiple web-applications. By doing this they can direct certain kind of requests (particularly those for common resources) to a common document root.

For example, by pointing all of the image requests for all web applications in this way, a developer is able to accumulate all of the common images in a common place for all web applications. Virtual directories thus ensure that common resources do not have to be copied for all web applications separately, and that the burden on the server itself is minimized.

This feature is targeted for applications written according to the J2EE Servlets and JSP specifications. However, virtual directories are not a part of J2EE.

In accordance with one embodiment, the invention comprises a system for using virtual directories to respond to uniform resource indicator requests in application servers, comprising: a web server component for receiving uniform resource indicator requests and passing said requests to the application server; a resource directory containing shared resources; and, a configuration file for specifying a virtual directory to be mapped to said resource directory and to be used in responding to said uniform resource indicator request.

In accordance with another embodiment, the invention comprises a method of using virtual directories to respond to uniform resource indicator requests in application servers, comprising the steps of: receiving uniform resource indicator requests at a web server component for communication to the application server; identifying using a configuration file a resource directory to be used; mapping said resource directory to a virtual directory; and, communicating content from said resource directory to said servlet using a mapping of said virtual directory.

DETAILED DESCRIPTION

The invention provides a system and method for providing virtual directories for servlets, particularly for use by many different Web applications that share common files and resources, and that are intended for providing those resources to large numbers of users. Virtual directories provide a mechanism for automatically changing the root folder from the default Web application (webapp) root document folder (docroot) to a virtual directory or folder, in response to certain http/URL requests. The purpose of the feature is to allow the developer to configure different document roots for certain requests. By doing this they can direct certain kind of requests (particularly those for common resources) to a common document root. Virtual directories ensure that common resources do not have to be copied for all web applications separately, and that the burden on the server itself is minimized. Virtual directories are thus useful for saving disk space and for providing better administration.

Since this feature is not J2EE compliant, some other form of configuration is necessary. In one embodiment an XML file (weblogic.xml) is used to configure the virtual directories. By modifying the settings in the weblogic.xml file, users are able to customize the virtual directories handled by the application (weblogic) server.

Figure 1:
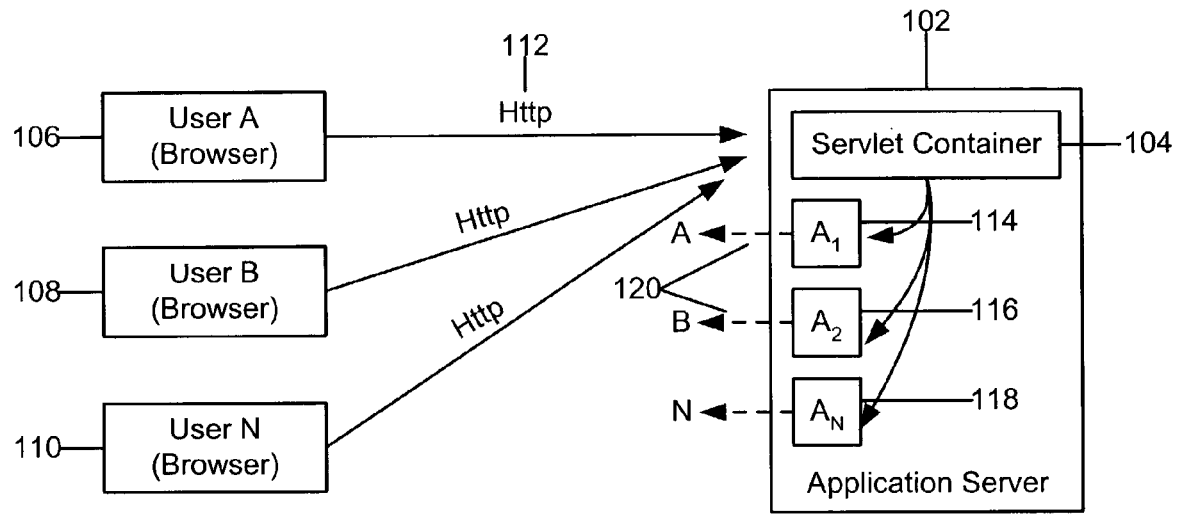
FIG. 1 shows a plan of a typical browser/application server interaction.

FIG. 1 shows a plan of a typical browser/application server interaction that does not use virtual directories. As shown in FIG. 1, a number (sometimes hundreds or thousands) of users 106, 108, 110 operating browsers, WAP devices, or some other type of Web access device, interact with an applications server 102 that includes a servlet container 104. The http request may arrive via a Web server, via a load balancer, or even directly to the server, depending on the particular implementation. In the example shown in FIG. 1, each of user A, user B, ... user N, all try to access the same resource using a variety of different web applications. Typically this access is by means of an http request 112 to the Web server. Access may be through the same or identical application in each instance, or it may be through different applications (webapp1, webapp 2, etc.) that merely use the same resource(s). It will be evident that any kind of resource, including, for example, text, graphical images, and other files, may be requested as part of the http request. Typically, the application server must provide copies of each resource in order to satisfy the needs of each webapp. In FIG. 1, these copies are indicated as resources A1 114, A2 116, and AN 118. Depending-on the webapp used, the different copies of the resource are used to service the respective http requests and provide a response 120 to the user.

Since the J2EE specification doesn't allow sharing of common resource, the customers (in this context the software developers) must copy the shared resources multiple times for each web application (webapp).

Figure 2:
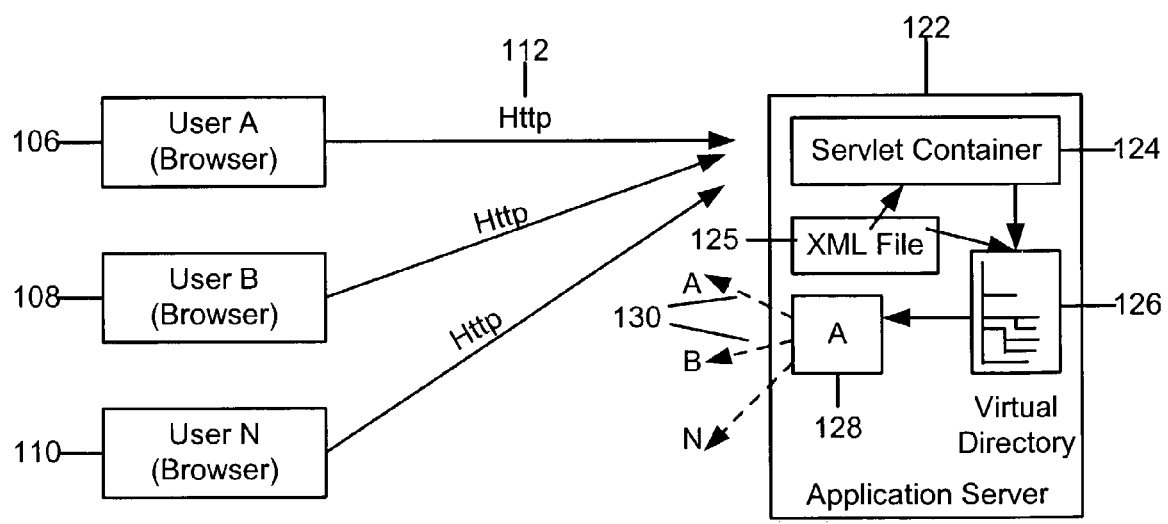
FIG. 2 shows a plan of an application server using a virtual directory in accordance with an embodiment of the invention.

FIG. 2 shows a plan of an application server using a virtual directory (or virtual directories), in accordance with an embodiment of the invention. As before, a number of users 106, 108, 110 operating browsers, or some other type of Web device, interact with an applications server 102 that includes a servlet container. Again, each of user A, user B, ... user N, all try to access the same resource by means of an http request 112 to the Web server, using a variety of different web applications. As mentioned above, this access may be through the same or identical application in each user instance, or it may be through different applications (webapp1, webapp 2, etc.) that merely use the same resource. This time, instead of providing copies of the required resource, the system checks the URL request against a previously configured XML configuration file 125 to see if a matching pattern exists, and to determine whether the resource is stored in the virtual directory 126. If the virtual directory indicates a mapped docroot, then the system allows concurrent synchronized access to that shared resource 128. The shared resource is then used to service the respective http requests and provide a response 130 to the user.

In this way, virtual directories provide a mechanism for automatically changing the docroot of the given Web application to a virtual directory or folder, in response to certain http requests. The developer may configure different document roots for certain requests so that any common resources can be shared between multiple web-applications. From the user's perspective the end result is the same, but from an administrative point of view the virtual directory is easier to manage, and the ability to provide shared access to a single resource places less performance burden on the application server. The invention thus allows the administrator to specify common resources (i.e. multiple instances of servlets, images etc). For example GIF and jpg images can be placed in a (typically read-only) virtual directory. When the system receives a request to access one of these images the request is redirected to the virtual directory. Using this method the system can satisfy the needs of many customers, using a variety of webapps, with only a single instance of the resource.

Figure 3:
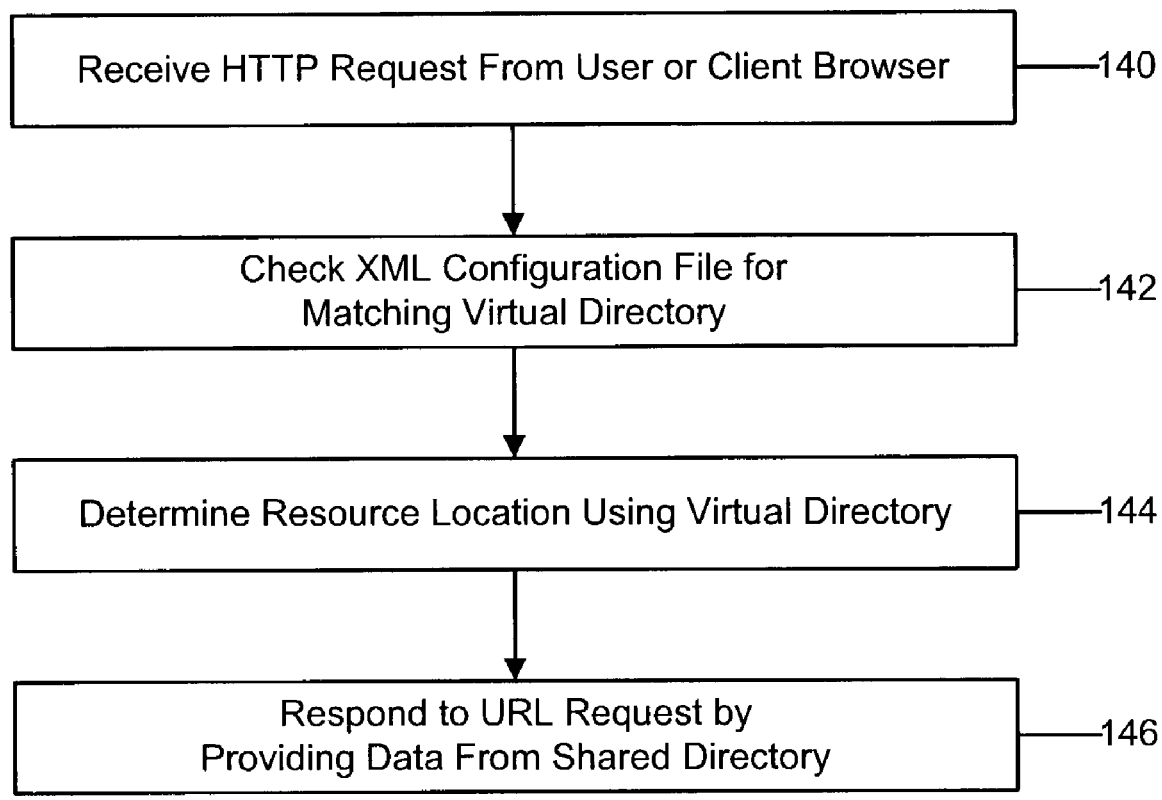
FIG. 3 shows a flowchart of a method for providing and using a virtual directory in accordance with an embodiment of the invention.

FIG. 3 shows a flowchart of a method for providing and using a virtual directory in accordance with the invention. In step 140, the system receives a request from a user of client browser for a particular URL. In step 142, the configuration file (in one embodiment the weblogic.xml file) is searched to find any matching virtual directories. If one exists, the system determines, in step 144, the resource location using the virtual directory. In step 146, the request is satisfied by retrieving the resource from the shared directory. If for some reason the virtual directory fails or dies then the system returns a null or "not found" unless the virtual directory has been installed in some failover manner on a shared file system. In any case re-sending the http request should be enough to retrieve a new copy from another node in the cluster.

Configuration File (Weblogic.xml) Syntax

An administrator or developer can administer, monitor, or tune the virtual directories either through an administrative console or directly by editing the configuration file. Virtual directories are configured in the same manner as the servlet mappings. The developer must provide a mapping of certain uri's to physical location on the disk. The document root will be set when the request is being resolved. The pattern matching is performed similarly to the pattern matching for HTTP requests as per J2EE. The virtual directories's local path can be a directory or a jar file. The Servlet Container should be able to handle both the cases. For an incoming request, if a virtual directory has been specified then the Servlet Container will search for the requested resource first in the virtual directory and if not found there then it will look into the webapp's original doc root. This defines the precedence if the same document exists in both places.

The syntax of an entry in the configuration file (for Weblogic server the weblogic.xml file is used although it will be evident that any other type of configuration file could be equally used) is as follows:

```
<!--
    <!ELEMENT virtual-directory-mapping (local-path,
        url-pattern)>
-->
```

Within the xml file statement shown above, the local-path element specifies a physical location on the disk at which the resource, image, object etc. is stored. The url-pattern element contains the url pattern of the mapping, i.e. the URL request that the server receives from the user or client browser.

By specifying virtual directory mappings a developer can change the default docroot for certain requests. Virtual-directory-mapping thus defines a mapping between a physical directory location and a url pattern within a request. A given request will be resolved to exactly one document root. If none of the register patterns matches the incoming URI then the doc root will be default to the webapp docroot.

The following examples illustrate how a url-pattern can be used to map a virtual directory on to a folder. In this example, a URL request including the pattern "/images/" or ".JPG" is mapped into the c:/usr/gifs local directory. Similarly, a URL request including the pattern ".JSP" is mapped into a JAR file c:/usr/common_jsps.jar.

```
<virtual-directory-mapping>

<local-path>c:/usr/gifs</local-path>

<url-pattern>/images/*</url-pattern>

<url-pattern>*.jpg</url-pattern>

</virtual-directory>

<virtual-directory-mapping>

<local-path>c:/usr/common_jsps.jar</local-path>

<url-pattern>*.jsp</url-pattern>

</virtual-directory>
```

Incorporating the virtual directory feature into existing application servers should have no impact on the runtime performance of the servlet engine, since the virtual directory feature is only actually used when virtual directories are specified in the configuration file. If no virtual directories are registered with the engine, then the runtime performance should not change.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the virtual directory feature described above can be used to serve other resources and file types beyond those described. Also, it should be noted that the virtual directory feature can be used with other features such as response caching, described in further detail in U.S. Provisional Patent Application No. 60/349,443, "SYSTEM AND METHOD FOR URL RESPONSE CACHING AND FILTERING IN SERVLETS AND APPLICATION SERVERS" filed Jan. 18, 2002, to provide a high performance means of sharing data and serving that data to the user. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented system for using virtual directories to respond to uniform resource indicator requests in application servers, comprising:
   at least one processor and memory, the at least one processor and memory implementing:
      an application server including a servlet container for receiving a plurality of uniform resource indicator requests;
      a resource directory containing shared resources,
         wherein a uniform resource indicator request to access a resource is redirected to a virtual directory instead of an original document root located on the application server, and
         wherein redirection prevents resources from being copied to satisfy the uniform resource indicator request;

a configuration file used by the servlet container in responding to said plurality of uniform resource indicator requests,
- wherein the virtual directory located on the application server is an entry in the configuration file that includes a local-path element for specifying a physical location of the resource directory, and a plurality of uri-pattern elements,
- each element specifying a pattern of uniform resource indicator requests,
- further wherein at least one of the plurality of uri-pattern elements includes a wildcard, and
- wherein the virtual directory is accessible by a plurality of different servlet applications,
- wherein each servlet application uses its own virtual directory to access the resource directory;

wherein the resource directory containing shared resources is used to service each one of the plurality of uniform resource indicator requests by matching a pattern specified by at least one of the plurality of uri-pattern elements;

wherein if the virtual directory indicates a matched pattern specified by at least one of the plurality of uri-pattern elements, the system allows for concurrent synchronized access to the shared resources instead of providing copies of the shared resources to satisfy the plurality of uniform resource indicator requests; and wherein if the virtual directory does not indicate a matched pattern specified by at least one of the plurality of uri-pattern elements, then the system provides copies of the required resource to satisfy the plurality of uniform resource indicator requests.

2. The computer-implemented system of claim 1 wherein said plurality of uniform resource indicator requests are received from a user operating a web browser application.

3. The computer-implemented system of claim 1 wherein said plurality of uniform resource indicator requests are received from a software application.

4. The computer-implemented system of claim 1 wherein the configuration file is an extensible markup language (XML) file containing a plurality of entries defining the configuration of the application server environment.

5. The computer-implemented system of claim 4 wherein the virtual directory is specified as an entry in the XML file.

6. The computer-implemented system of claim 4 wherein the application server is a weblogic server and said XML file is a weblogic.xml file.

7. The computer-implemented system of claim 1 wherein the virtual directory's local path is an actual directory.

8. The computer-implemented system of claim 1 wherein the virtual directory's local path is a Java Archive (JAR) file.

9. A method of using virtual directories to respond to uniform resource indicator requests in application servers, comprising the steps of:

receiving a plurality of uniform resource indicator requests at a servlet container for use by an application server;

identifying using a configuration file a resource directory containing shared resources to be used to service each one of the plurality of uniform resource indicator requests,
- wherein a uniform resource indicator request to access a resource is redirected to a virtual directory instead of an original document root located on the application server, and
- wherein redirection prevents resources from being copied to satisfy the uniform resource indicator request,
- wherein the virtual directory located on the application server is an entry in the configuration file that includes a local-path element for specifying a physical location of the resource directory, and a plurality of uri-pattern elements, each element specifying a pattern of uniform resource indicator requests,
- further wherein at least one of the plurality of uri-pattern elements includes a wildcard,
- wherein said virtual directory is accessible by a plurality of different servlet applications, and
- wherein each servlet application uses its own virtual directory to access the resource directory; and, communicating the shared content from said resource directory to said servlet using a mapping of said virtual directory for each one of the plurality of uniform resource indicator requests that match a pattern specified by at least one of the plurality of uri-pattern elements included in the virtual directory,
- wherein the communicating allows for concurrent synchronized access to the shared content when at least one of the plurality of uri-pattern elements match a pattern specified by at least one of the plurality of uri-pattern elements included in the virtual directory.

10. The method of claim 9 wherein said plurality of uniform resource indicator requests are received from a user operating a web browser application.

11. The method of claim 9 wherein said plurality of uniform resource indicator requests are received from a software application.

12. The method of claim 9 wherein the configuration file is an extensible markup language (XML) file containing a plurality of entries defining the configuration of the application server environment.

13. The method of claim 12 wherein the virtual directory is specified as an entry in the XML file.

14. The method of claim 12 wherein the application server is a weblogic server and said XML file is a weblogic.xml file.

15. The method of claim 9 wherein the virtual directory's local path is an actual directory.

16. The method of claim 9 wherein the virtual directory's local path is a JAR file.

* * * * *

UNITED STATES PATENT AND TRADEMARK OFFICE
CERTIFICATE OF CORRECTION

| | | |
|---|---|---|
| PATENT NO. | : 7,552,189 B2 | Page 1 of 1 |
| APPLICATION NO. | : 10/347077 | |
| DATED | : June 23, 2009 | |
| INVENTOR(S) | : Vinod Mehra | |

It is certified that error appears in the above-identified patent and that said Letters Patent is hereby corrected as shown below:

On the Title Pg, Item (54) in "Title", line 3, before "IN" delete "URL REQUESTS".

On the Title Pg, Item (56) under "Other Publications", line 1, delete "Micosoft" and insert -- Microsoft --, therefor.

In column 1, line 3, before "IN" delete "URL REQUESTS".

In column 3, line 62, delete "106,108,110" and insert -- 106, 108, 110 --, therefor.

In column 4, line 12, delete "Depending-on" and insert -- Depending on --, therefor.

In column 5, line 2, delete "or"not" and insert -- or "not --, therefor.

In column 5, line 17, delete "directories's" and insert -- directories --, therefor.

In column 5, line 47, delete "on to" and insert -- onto --, therefor.

In column 8, line 3, in claim 9, after "identifying" insert -- , --.

In column 8, line 3, in claim 9, after "file" insert -- , --.

Signed and Sealed this

Twenty-ninth Day of June, 2010

David J. Kappos
*Director of the United States Patent and Trademark Office*